United States Patent
Al-Taweel

(10) Patent No.: US 9,402,337 B2
(45) Date of Patent: Aug. 2, 2016

(54) SHOVEL WITH A FULCRUM PROJECTION AND A METHOD FOR ITS USE

(71) Applicant: Nicholas S Al-Taweel, Methuen, MA (US)

(72) Inventor: Nicholas S Al-Taweel, Methuen, MA (US)

( * ) Notice: Subject to any disclaimer, the term of this patent is extended or adjusted under 35 U.S.C. 154(b) by 179 days.

(21) Appl. No.: 14/246,701

(22) Filed: Apr. 7, 2014

(65) Prior Publication Data

US 2015/0282418 A1    Oct. 8, 2015

(51) Int. Cl.
*A01B 1/02*    (2006.01)
*E02F 3/02*    (2006.01)

(52) U.S. Cl.
CPC .. *A01B 1/028* (2013.01); *E02F 3/02* (2013.01)

(58) Field of Classification Search
CPC .............. A01B 1/04; A01B 1/28; A01B 1/06
See application file for complete search history.

(56) References Cited

U.S. PATENT DOCUMENTS

| | | | |
|---|---|---|---|
| 738,057 A | 9/1903 | O'Connor | |
| 838,498 A | 12/1906 | Clark | |
| 1,353,494 A | 9/1920 | Risch | |
| 2,484,409 A | 10/1949 | Jameson | |
| 3,035,816 A | 5/1962 | Conant | |
| 4,663,995 A * | 5/1987 | Amundson | B25B 27/00 254/131.5 |
| 5,669,651 A * | 9/1997 | Vroegindewey | B25G 1/00 254/131.5 |
| 5,732,933 A | 3/1998 | Champi | |
| 6,058,809 A * | 5/2000 | Flanz | E04D 15/003 254/131 |
| 6,485,076 B1 | 11/2002 | Chang | |
| 6,964,407 B1 * | 11/2005 | Butler | B66F 19/005 254/131 |
| 7,052,058 B2 * | 5/2006 | Olinski | A01D 9/00 254/131.5 |
| 2015/0282418 A1 * | 10/2015 | Al-Taweel | A01B 1/028 294/59 |

* cited by examiner

*Primary Examiner* — Lee D Wilson
(74) *Attorney, Agent, or Firm* — Law Office of Illya Libenzon

(57) ABSTRACT

A shovel with a fulcrum projection is disclosed. The shovel has a blade with a front, a back, a proximate end, and a pointed distal end, a handle joined to the proximal end of the blade, and a fulcrum member projecting behind the back of the blade. In some embodiments, the fulcrum member's vertical position is adjustable; in additional embodiments, the blade is serrated or the shovel has footrests.

9 Claims, 3 Drawing Sheets

200

Providing a Shovel Having a Fulcrum Projection
201

Inserting the Blade of the Shovel into the Ground so that Part of the Fulcrum Member Rests upon the Ground
202

Rotating the Handle Downward around the Fulcrum Member such that the Blade Rotates upward toward a Horizontal Position
203

SHOVEL WITH A FULCRUM PROJECTION AND A METHOD FOR ITS USE

TECHNICAL FIELD

This invention relates generally to handheld digging equipment generally, and to shovels with fulcrum devices in particular.

BACKGROUND ART

Shoveling is hard work, but is often a necessary task in various outdoor professions and hobbies. The most difficult parts of shoveling are the initial thrust of the shovel into the ground, and prying up the shovelful from the ground after the thrust. The thrust can be hampered by rocks and living matter such as roots, and in tightly-packed earth can require a substantial amount of force. The initial part of lifting the loaded shovel can be made difficult by cohesive substrates, and requires the exertion of substantial force while the body is in an awkward position. Using the shovel as a lever is often a good way to overcome the latter difficulties, but the ground beneath the shovel blade makes for an indifferent fulcrum; the more it yields, the less advantage levering the shovel confers.

Therefore, there remains a need for a shovel that acts as a more effective lever and gives its user more control over the degree of leverage available.

SUMMARY OF THE EMBODIMENTS

Disclosed is a shovel having a fulcrum projection. The shovel includes a digging blade having a proximal end, a distal end having a point, a substantially concave front, a substantially convex back, and two edges. The shovel also includes a handle attached to the proximal end of the blade, and a fulcrum member located at the rear of the blade.

In a related embodiment, the edges of the blade are serrated. In another embodiment, the fulcrum member is substantially perpendicular to an axis that that is substantially orthogonal to the handle and that intersects the blade halfway between the two edges. In an additional embodiment, the fulcrum member further includes a bar having a proximal end at the back of the blade and a distal end, the bar forming an angle with the handle of approximately 45 degrees. In another embodiment, a portion of the fulcrum member near to the distal end curves in a convex direction with respect to the handle. In yet another embodiment, the position of the fulcrum member between the proximal and distal ends of the blades is slideably adjustable. In a related embodiment, the fulcrum member further includes a bar that is substantially parallel to the handle, the bar having a plurality of holes along its length, the bar inserted in a bracket fixed near the proximal end of the blade, the bracket having a pin that may be removably inserted into one of the plurality of holes. Another embodiment includes at least one footrest near the proximal end of the blade.

A method is also described for digging with shovel having a fulcrum projection. The method includes providing a shovel as described above, inserting the blade of the shovel into the ground so that part of the fulcrum member rests upon the ground, and rotating the handle downward around the fulcrum member such that the blade rotates upward toward a horizontal position.

Other aspects, embodiments and features of the device and method will become apparent from the following detailed description of the device and method when considered in conjunction with the accompanying figures. The accompanying figures are for schematic purposes and are not intended to be drawn to scale. In the figures, each identical or substantially similar component that is illustrated in various figures is represented by a single numeral or notation at its initial drawing depiction. For purposes of clarity, not every component is labeled in every figure. Nor is every component of each embodiment of the device and method shown where illustration is not necessary to allow those of ordinary skill in the art to understand the device and method.

BRIEF DESCRIPTION OF THE DRAWINGS

The preceding summary, as well as the following detailed description of the device and method, will be better understood when read in conjunction with the attached drawings. It should be understood that the device and method are not limited to the precise arrangements and instrumentalities shown.

DETAILED DESCRIPTION OF SPECIFIC EMBODIMENTS

Embodiments of the disclosed device and method allow a user to exert greater amounts of torque when extracting earth from the ground using the disclosed shovel. The user may increase the available torque by moving the fulcrum closer to the tip of the shovel, for particularly difficult substrates. Serrations and footrests aid in thrusting the shovel into ground containing roots or other challenging impediments to effective digging.

Figure 1A:
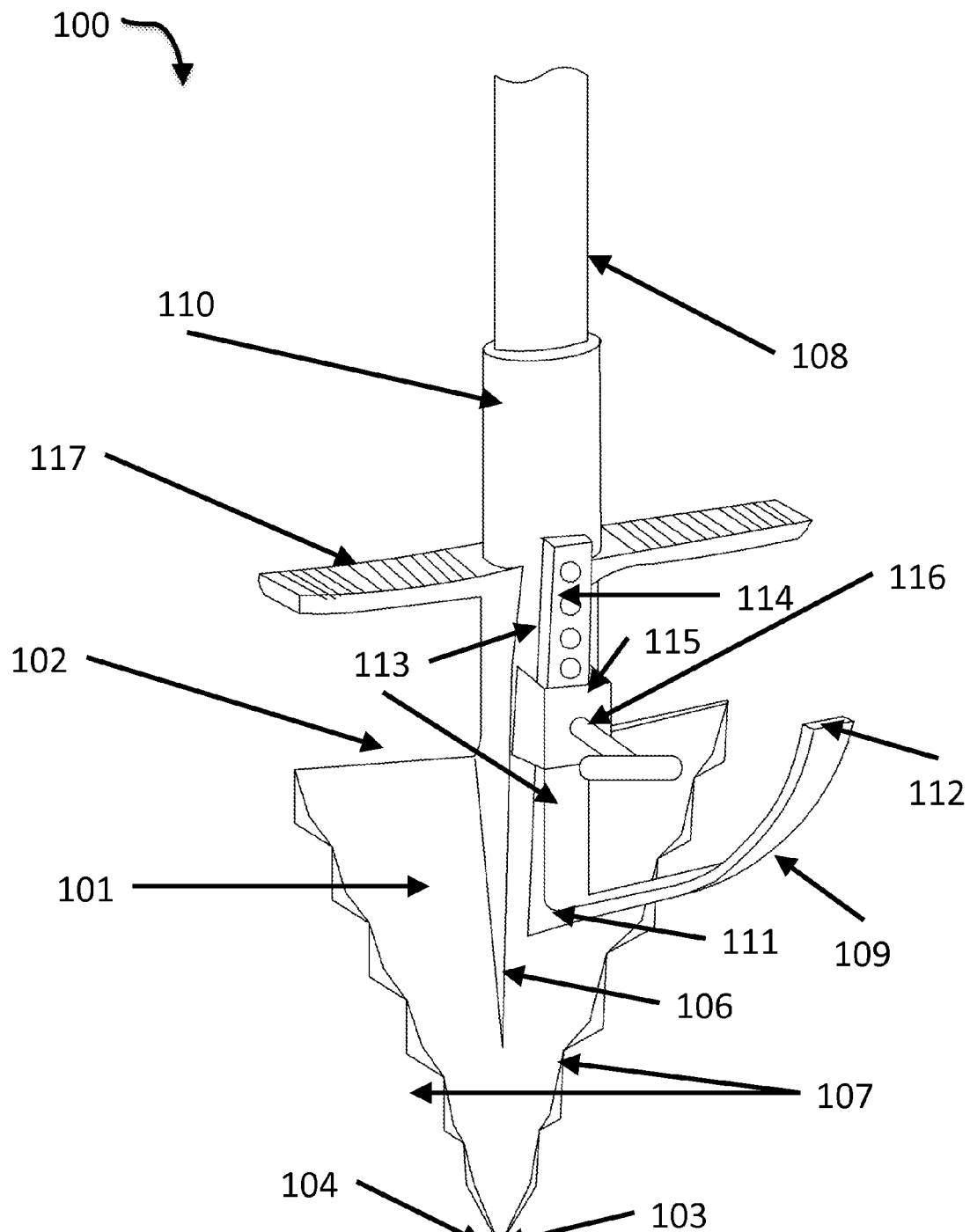
FIG. 1A is a schematic diagram illustrating a view of one embodiment of the disclosed shovel.
Figure 1B:
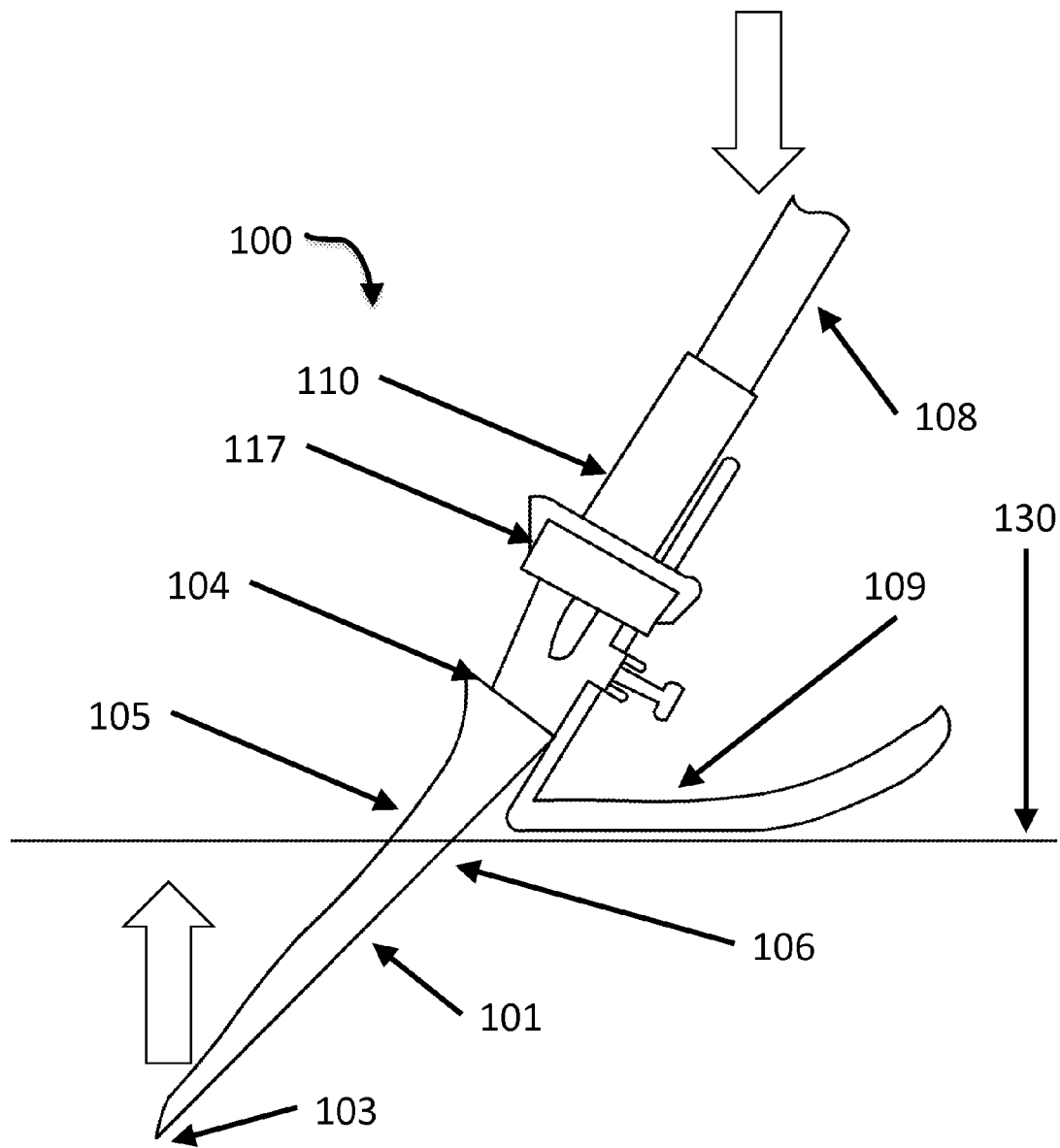
FIG. 1B is a schematic diagram illustrating the use of one embodiment of the disclosed shovel in digging.

FIG. 1 depicts one embodiment of a shovel having a fulcrum projection 100. The shovel 100 includes a digging blade 101 having a proximal end 102, a distal end 103 having a point 104, a substantially concave front 105, a substantially convex back 106, and two edges 107. The shovel 100 also includes a handle 108 attached to the proximal end 102 of the blade 101. The shovel 100 also includes a fulcrum member 109 located at the back 110 of the blade.

The shovel 100 includes a digging blade 101 having a proximal end 102, a distal end 103 having a point 104, a substantially concave front 105, a substantially convex back 106, and two edges 107. The blade 101 may be made of any material or combination of materials suited for the purpose of digging the material a particular embodiment of the shovel 100 is designed to dig. The blade 101 may be composed at least in part of metal. The metal may include aluminum. The metal may include iron. The metal may include steel. The metal may include tungsten. The blade 101 may be composed at least in part of a polymer material. The polymer material may be plastic. The polymer material may be carbon fiber. The blade 101 may be composed at least in part of ceramic. The blade 101 may be scoop-shaped; the substantially concave curvature of the front 105 of the blade 101 may be so formed that it can scoop up loose materials, such as earth, more readily than a flat surface. The edges 107 of the blade may angle upward with respect to the front 105 of the blade 101, to add depth to the scoop. The proximal end 102 of the blade may also have an edge that angles upward with respect to the front of the blade 105, to help prevent material from sliding off the blade at the proximal end 102. The blade may taper from a broad width at the proximal end 102 to the point 104 at the distal end 103. The edges 107 may taper in a straight line from the proximal end 102 to the point 104. The edges 107 may taper in a curved line from the proximal end 102 to the point 104. In some embodiments, the edges 107 of the blade 101 are serrated. In some embodiments, the edges 107 of the blade 101 are sharpened. The edges 107 of the blade 101 may be both serrated and sharpened.

The shovel 100 also includes a handle 108 attached to the proximal end 102 of the blade 101. The handle 108 may be composed of any materials or combination of materials having suitable strength and rigidity for the purpose to which an embodiment of the shovel is applied. The handle 108 may be composed at least in part of metal. The metal may include aluminum. The metal may include iron. The metal may include steel. The metal may include tungsten. The handle 108 may be composed at least in part of a polymer material. The polymer material may be plastic. The polymer material may be carbon fiber. The handle 108 may be composed at least in part of fiberglass. The handle 108 may be composed at least in part of ceramic. The handle 108 may be composed of wood. In some embodiments, the handle 108 is substantially cylindrical. The handle 108 may be partially hollow; for instance, the handle 108 may be a metal or fiberglass tube.

The handle 108 is attached to the proximal end 102 of the blade 101. The handle 108 may be fused to the proximal end 102. In some embodiments, the handle 108 and the blade 101 form a monolithic whole. In other embodiments, the handle 108 is riveted to the proximal end 102. In still other embodiments, the handle 108 is bolted to the proximal end 102. The proximal end 102 may include a shaft 110 that attaches to the handle 108. The shaft 110 may be hollow, such that the handle 108 is attached to the proximal end 102 by insertion into the shaft 110. The internal area of the shaft 110 may be formed to fit snugly over an end of the handle 108; for instance, where the handle 108 is substantially cylindrical, the shaft 110 may form a substantially cylindrical tube having an internal radius very slightly larger than the exterior radius of the handle 108. The handle 108 may be secured within the shaft 110 using any technique that causes the handle 108 to remain firmly and largely immovably fixed within the shaft 110. In some embodiments, the end of the handle 108 and the interior of the shaft 110 are threaded so that the end of the handle 108 may be screwed into the shaft 110. In other embodiments, the handle 108 is glued within the shaft 110. In still other embodiments, the handle 108 is bolted within the shaft 110. The handle 108 may be secured in the shaft 110 using a screw. The handle 108 may be secured within the shaft 110 using a nail. The handle 108 may be secured within the shaft 110 using a rivet.

The shovel 100 also includes a fulcrum member 109 located at the back 106 of the blade. The fulcrum member 109 may be constructed from any material or combination of materials suitable for constructing the blade 101 or the handle 108. The fulcrum member 109 may be located at a point between the proximal end 102 and the distal end 103 on the back 106 of the blade. In some embodiments, the fulcrum member 109 is substantially perpendicular to an axis that that is substantially orthogonal to the handle and that intersects the blade 110 halfway between the two edges 107; in other words, if an axis parallel to the handle 108 is vertical, and an axis running perpendicular to the vertical axis and intersecting both edges 107 is horizontal, the fulcrum member 109 may be perpendicular to the horizontal axis. In some embodiments, the fulcrum member 109 includes a bar having a proximal end 111 at the back 106 of the blade and a distal end 112, the bar forming an angle with the handle 108 of approximately 45 degrees. This angle of the fulcrum member 109 may guide the insertion of the shovel blade 101 into the ground 130 at an angle of approximately 45 degrees. In some embodiments, a portion of the fulcrum member 109 near to the distal end 112 curves in a concave direction with respect to the handle. This may result in a portion of the fulcrum member 109 curving in a convex direction with respect to the ground 130, so that the shovel 100 can roll on the fulcrum member 109 when being rotated on the fulcrum member 109 as set forth in more detail below.

In some embodiments, the position of the fulcrum member 109 between the proximal end 102 and distal end 103 of the blade is slideably adjustable. For instance, the fulcrum member 109 may be joined to the handle 108 by means of a collar that wraps around the handle 108, and which may be secured in a position along the handle 108 by means of a screw that contacts the handle 108. The collar may be secured in position along the handle 108 by means of a screw that tightens the collar so that it clamps the handle 108. The collar may be secured in position by any other clamp apparatus. Where the handle 108 connects to a shaft 110, the collar may be similarly placed and secured around the shaft 110. In some embodiments, the position of the fulcrum member 109 is slidably adjustable only along a vertical axis as defined above in reference to FIGS. 1A-1B. For instance, where the fulcrum member 109 attaches to the shaft 110 or handle 108 as described above in reference to FIGS. 1A-1B, the shaft 110 or handle 108 may have a vertically oriented protruding ridge that engages with a groove in the collar, so that the collar cannot be rotated around the handle 108 or shaft 110, and can only slide along the ridge. In another embodiment, the fulcrum member 109 further includes a bar 113 that is substantially parallel to the handle, the bar 113 having a plurality of holes 114 along its length, the bar inserted in a bracket 115 fixed near the proximal end 102 of the blade 101, the bracket 116 having a pin 116 that may be removably inserted into one of the plurality of holes 114. The pin 116 may have a spring with a bias that resists removal of the pin 116 from the hole 114 in which it is inserted, so that the fulcrum member 109 remains securely in place unless the pin 116 is intentionally pulled from the hole 114 by a user. In an additional embodiment, the fulcrum member 109 further includes a bar 113 that is substantially parallel to the handle and inserted in a bracket having a plurality of holes along its length, the bar having a pin that may be removably inserted into one of the plurality of holes. The pin may have a spring with a bias that resists removal of the pin from the hole in which it is inserted, so that the fulcrum member 109 remains securely in place unless the pin is intentionally pulled from the hole by a user. The slideable adjustment of the fulcrum member 109 may serve to increase the torque on the portion of the blade 101, or to increase the volume of earth taken into the blade 101, depending on the direction of adjustment as discussed below.

In some embodiments, the shovel 100 also has at least one footrest 117 near the proximal end 102 of the blade 101. The at least one footrest 117 may be formed by the top surface of the proximal end 102 of the blade 101. The at least one footrest 117 may include at least one member separate from the blade 101. For instance, the at least one footrest 117 may include at least one member attached to the handle; the at least one member may be perpendicular to the handle. The at least one footrest 117 may include at least one member attached to the shaft 110; the at least one member may be perpendicular to the shaft 110. In some embodiments, the at least one member has treads on the surface opposite the blade 110, to aid in traction when a user steps on the at least one member. In some embodiments, the at least one member is two members opposite each other.

Figure 2:
FIG. 2 is a flowchart depicting one embodiment of a method for digging using the disclosed shovel.
Figure 2:

FIG. 2 is a flow chart depicting a method 200 for digging with a shovel having a fulcrum projection. The method 200 includes providing a shovel as described above in reference to FIGS. 1A-1B (201). The method 200 includes inserting the blade 101 of the shovel 100 into the ground 130 so that part of the fulcrum member 109 rests upon the ground (202). Where the shovel has at least one footrest 117, the user may rest a foot on the footrest 117 to increase the force of the thrust into the ground 130. The method 200 involves rotating the handle 108 downward around the fulcrum member 109, as shown by the downward-pointing directional arrow in FIG. 1B, such that the blade 101 rotates upward toward a horizontal position, as shown by the upward-pointing directional arrow in FIG. 1B (203). Where the fulcrum member 109 has a curved portion as disclosed above in reference to FIGS. 1A-1B, the user may rotate the shovel about that curved portion, as if the curved portion were a section of a wheel.

In some embodiments, where the fulcrum member 109 is slideably adjustable along the vertical axis, the method 200 further involves adjusting the position of the fulcrum member 109 on the vertical axis. As an example, the user may move the fulcrum member 109 to a point closer to the distal end 103 of the blade 101, to increase the amount of torque that the user can exert in the upward direction by rotating the handle 108 downward. The user may move the fulcrum member 109 to a point closer to the distal end 102 of the blade 101 to increase the depth of insertion of the blade 101 into the ground, and thus increase the volume of earth loaded on the blade 101 during the rotation.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A shovel having a fulcrum projection, the shovel comprising:
   a digging blade having a proximal end, a distal end, a substantially concave front, a substantially convex back, and two edges;
   a handle attached to the proximal end of the blade; and
   a fulcrum member located at the back of the blade, the fulcrum member comprising (i) a first bar having a proximal end at the back of the blade and a distal end, the first bar forming an angle with the handle of approximately 45 degrees, and (ii) a second bar that is substantially parallel to the handle, the second bar having a plurality of holes;
   a bracket in which the second bar is inserted, the bracket fixed near the proximal end of the blade, the bracket having a pin that may be removably inserted into one of the plurality of holes; and
   at least one footrest near the proximal end of the blade.

2. A shovel according to claim 1, wherein the edges of the blade are serrated.

3. A shovel according to claim 1, wherein the edges of the blade are sharp.

4. A shovel according to claim 1, wherein the fulcrum member is substantially perpendicular to an axis that that is substantially orthogonal to the handle and that intersects the blade halfway between the two edges.

5. A shovel according to claim 1, wherein the fulcrum member is located between the distal end and the proximal end of the blade.

6. A shovel according to claim 1 wherein a portion of the fulcrum member near to the distal end of the fulcrum member curves in a convex direction with respect to the handle.

7. A shovel according to claim 1, wherein the position of the fulcrum member between the proximal and distal ends of the blade is slideably adjustable.

8. A shovel according to claim 7, wherein the position of the fulcrum member may be adjusted only in a direction parallel to the handle.

9. A method for digging with shovel having a fulcrum projection, the method comprising:
   providing a shovel as provided in claim 1;
   inserting the blade of the shovel into the ground so that part of the fulcrum member rests upon the ground; and
   rotating the handle downward around the fulcrum member such that the blade rotates upward toward a horizontal position.

* * * * *